United States Patent
Ryan et al.

(10) Patent No.: US 11,426,689 B2
(45) Date of Patent: Aug. 30, 2022

(54) DEVICE FOR COLLECTING PARTICULATE MATTER

(71) Applicant: COLE-PARMER INSTRUMENT COMPANY LLC, Vernon Hills, IL (US)

(72) Inventors: Scott Ryan, Ocala, FL (US); Travis Pettengill, Shaftsbury, VT (US); Bill Barker, Jr., Ocala, FL (US); Wayne Sipes, Ocala, FL (US)

(73) Assignee: COLE-PARMER INSTRUMENT COMPANY LLC, Vernon Hills, IL (US)

( * ) Notice: Subject to any disclaimer, the term of this patent is extended or adjusted under 35 U.S.C. 154(b) by 290 days.

(21) Appl. No.: 16/275,963

(22) Filed: Feb. 14, 2019

(65) Prior Publication Data

US 2019/0255474 A1    Aug. 22, 2019

Related U.S. Application Data

(60) Provisional application No. 62/710,399, filed on Feb. 16, 2018.

(51) Int. Cl.
  *B01D 46/00*   (2022.01)
  *B01D 46/24*   (2006.01)
  (Continued)

(52) U.S. Cl.
  CPC ..... *B01D 46/0005* (2013.01); *B01D 39/1676* (2013.01); *B01D 46/0004* (2013.01);
  (Continued)

(58) Field of Classification Search
  CPC ........... B01D 46/0005; B01D 46/0004; B01D 46/0015; B01D 46/2403; B01D 39/1676;
  (Continued)

(56) References Cited

U.S. PATENT DOCUMENTS 3,966,439 A    6/1976  Vennos
4,350,507 A    9/1982  Greenough et al.
(Continued)

FOREIGN PATENT DOCUMENTS

WO    WO 2012/100364 A1    8/2012

OTHER PUBLICATIONS

Harper et al. Acid-Soluble Internal Capsules for Closed-Face Cassette Elemental Sampling and Analysis of Workplace Air, Journal of Occupational and Environmental Hygiene, Jun. 2013, vol. 10, pp. 297-306 (Year: 2013).*

(Continued)

*Primary Examiner* — Robert A Hopkins
*Assistant Examiner* — Qianping He
(74) *Attorney, Agent, or Firm* — ArentFox Schiff LLP (57) ABSTRACT

An improved device for collecting particulate matter suspended in the ambient air is disclosed comprising a container extending between an open first end and a closed second end defining a container interior. A container output communicates with a container interior located proximate the closed second end of the container. A filter cassette comprising a collection filter is permanently affixed to a filter holder. A retainer having a retainer input retains the filter cassette between the retainer input and the container output. An output connector connects the container output to a low pressure source for drawing ambient air into the retainer input for enabling the collection filter to collect particulate matter suspended in the ambient air entering the retainer input. Preferably, the filter holder and the filter are disposable.

10 Claims, 13 Drawing Sheets

(51) Int. Cl.
 *B01D 39/16* (2006.01)
 *G01N 1/22* (2006.01)
 *G01N 1/40* (2006.01)

(52) U.S. Cl.
 CPC ..... *B01D 46/0015* (2013.01); *B01D 46/2403* (2013.01); *G01N 1/2205* (2013.01); *G01N 1/2273* (2013.01); *G01N 1/4055* (2013.01); *B01D 2265/02* (2013.01); *B01D 2265/04* (2013.01); *B01D 2265/06* (2013.01); *G01N 2001/2276* (2013.01); *G01N 2001/2288* (2013.01)

(58) Field of Classification Search
 CPC ............ B01D 2265/02; B01D 2265/04; B01D 2265/06; B01D 46/00; B01D 46/24; B01D 39/16; G01N 1/2205; G01N 1/2273; G01N 1/4055; G01N 2001/2276; G01N 2001/2288; G01N 1/22; G01D 1/22
 USPC .................................. 55/490–519; 73/863.23
 See application file for complete search history.

(56) References Cited

U.S. PATENT DOCUMENTS

| | | | |
|---|---|---|---|
| 4,534,230 A | | 8/1985 | Courbon |
| 4,675,034 A † | | 6/1987 | Lynch |
| 5,012,681 A | | 6/1991 | Lentzen |
| 5,404,762 A * | 4/1995 | Rodgers | B01D 46/10 73/863.25 |
| 6,779,411 B1 | 8/2004 | Spurgeon | |
| 7,934,434 B2 * | 5/2011 | Shelton | G01N 1/2205 73/864.34 |
| 2003/0075048 A1* | 4/2003 | Jordan, Sr. | B01D 45/10 95/285 |
| 2007/0044577 A1* | 3/2007 | Trakumas | G01N 1/2208 73/863.22 |
| 2008/0047437 A1* | 2/2008 | Oo | B01D 46/10 96/134 |
| 2008/0233638 A1 | 9/2008 | Ryan | |
| 2011/0067505 A1 | 3/2011 | Page et al. | |
| 2015/0128732 A1 | 5/2015 | Harner | |
| 2017/0097287 A1* | 4/2017 | Clavaguera | G01N 1/2205 |

OTHER PUBLICATIONS

L'Orange et al. A simple and Disposable Sampler for Inhalable Aerosol, Ann. Occup. Hyp., Mar. 2016, vol. 60, No. 2, pp. 150-160 (Year: 2016).*

European Search Report from the European Patent Office in counterpart European Application No. 19754929.8, dated Oct. 15, 2021.

Harper et al. entitled Acid-Soluble Internal Capsules for Closed-Face Cassette Elemental Sampling and Analysis of Workplace Air, Journal of Occupational and Environmental Hygiene, Jun. 2013, vol. 10, pp. 297-306.†

L'Orange et al. entitled A simple and Disposable Sampler for Inhalable Aerosol, Ann. Occup. Hyp., Mar. 2016, vol. 60, No. 2, pp. 150-160.†

\* cited by examiner
† cited by third party

PRIOR ART

DEVICE FOR COLLECTING PARTICULATE MATTER

CROSS-REFERENCE TO RELATED APPLICATIONS

This application claims benefit of U.S. Patent Provisional application No. 62/710,399 filed Feb. 16, 2018. All subject matter set forth in provisional application No. 62/710,399 filed Feb. 16, 2018 is hereby incorporated by reference into the present application as if fully set forth herein.

BACKGROUND OF THE INVENTION

Field of the Invention

This invention relates to air quality, and more particularly to a device for collecting and measuring particulate matter suspended in the ambient air.

Description of the Related Art

Various types of devices have been devised in the past for determining and measuring particulate matter suspended in the ambient air. One of the most significant devices for measuring particulate matter suspended in the ambient air is set forth in U.S. Pat. No. 4,675,034.

U.S. Pat. No. 4,675,034 provides a personal air sampler which is carried by an individual to collect dust to which these individuals are exposed during normal activity. The personal air sampler has a removable filter unit having a collection filter to collect a dust sample representative of the total inspirable dust inhaled by the individual. The removable filter unit is removed and the collection filter is analyzed accordingly. A new collection filter is installed in the filter unit for subsequent use.

It is an object of the present invention to improve upon the personal air sampler set forth in U.S. Pat. No. 4,675,034 and to provide an improved device for collecting particulate matter suspended in the ambient air have an improved design and improved filter cassette.

Another object of the present invention is to provide an improved device for collecting particulate matter suspended in the ambient air having a disposable filter cassette.

Another object of the present invention is to provide an improved device for collecting particulate matter suspended in the ambient air having a two stage filter cassette.

Another object of the present invention is to provide an improved device for collecting particulate matter suspended in the ambient air having a solvent soluble filter cassette for extracting any collected particulate material from the filter.

Another object of the present invention is to provide an improved device for collecting particulate matter suspended in the ambient air having a reduced internal volume for enabling local analysis of the collected particulate matter.

The foregoing has outlined some of the more pertinent objects of the present invention. These objects should be construed as being merely illustrative of some of the more prominent features and applications of the invention. Many other beneficial results can be obtained by modifying the invention within the scope of the invention. Accordingly other objects in a full understanding of the invention may be had by referring to the summary of the invention, the detailed description describing the preferred embodiment in addition to the scope of the invention defined by the claims taken in conjunction with the accompanying drawings.

SUMMARY OF THE INVENTION

The present invention is defined by the appended claims with specific embodiments being shown in the attached drawings. For the purpose of summarizing the invention, the invention relates to an improved device for collecting particulate matter suspended in the ambient air through the use of a low pressure air source. The improved device comprises a container extending between an open first end and a closed second end defining a container interior. A container output communicates with the container interior located proximate the closed second end of the container. A filter cassette comprising a collection filter is permanently affixed to a filter holder. A retainer having a retainer input is secured removably to the open first end of the container for retaining the filter cassette between the retainer input and the container output. An output connector connects the container output to the low pressure source for drawing ambient air into the retainer input for enabling the collection filter to collect particulate matter suspended in the ambient air entering the retainer input. Preferably, the filter holder and the filter are disposable.

In a more specific example, the filter is permanently affixed to the filter holder such a fusing methodology or the like. Preferably the filter holder and the filter are formed of a polymeric material that are soluble in a solvent for extracting any collected particulate material from the filter.

In another more specific example, the cassette includes a foam filter located upstream from the filter for collecting large particulate matter suspended in the ambient air.

The foregoing has outlined rather broadly the more pertinent and important features of the present invention in order that the detailed description that follows may be better understood so that the present contribution to the art can be more fully appreciated. Additional features of the invention will be described hereinafter which form the subject of the claims of the invention. It should be appreciated by those skilled in the art that the conception and the specific embodiments disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a fuller understanding of the nature and objects of the invention, reference should be made to the following detailed description taken in connection with the accompanying drawings in which.

Similar reference characters refer to similar parts throughout the several Figures of the drawings.

DETAILED DISCUSSION

Figure 1:
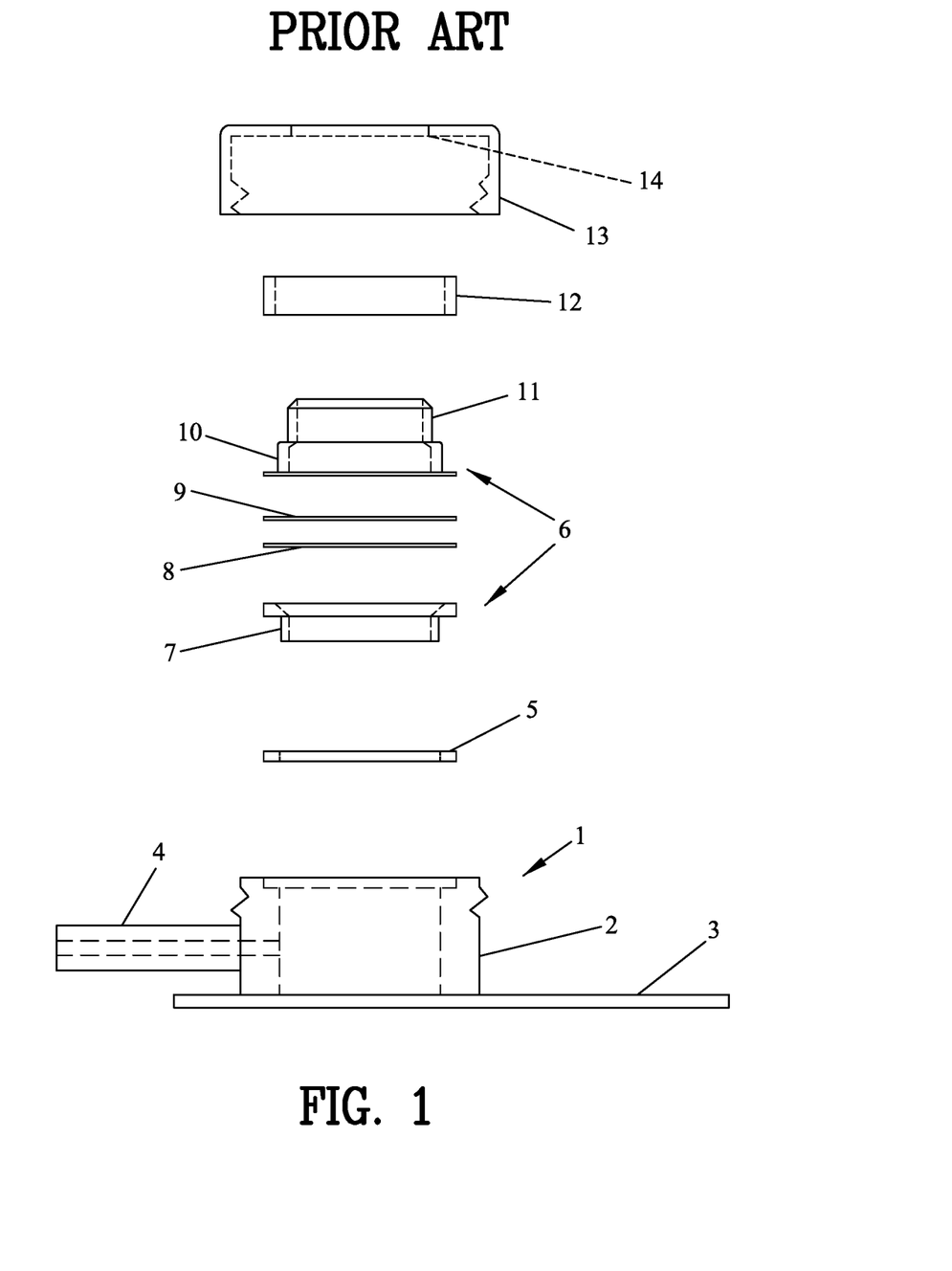
FIG. 1 is an exploded view of a personal air sampler of the prior art.
Figure 2:
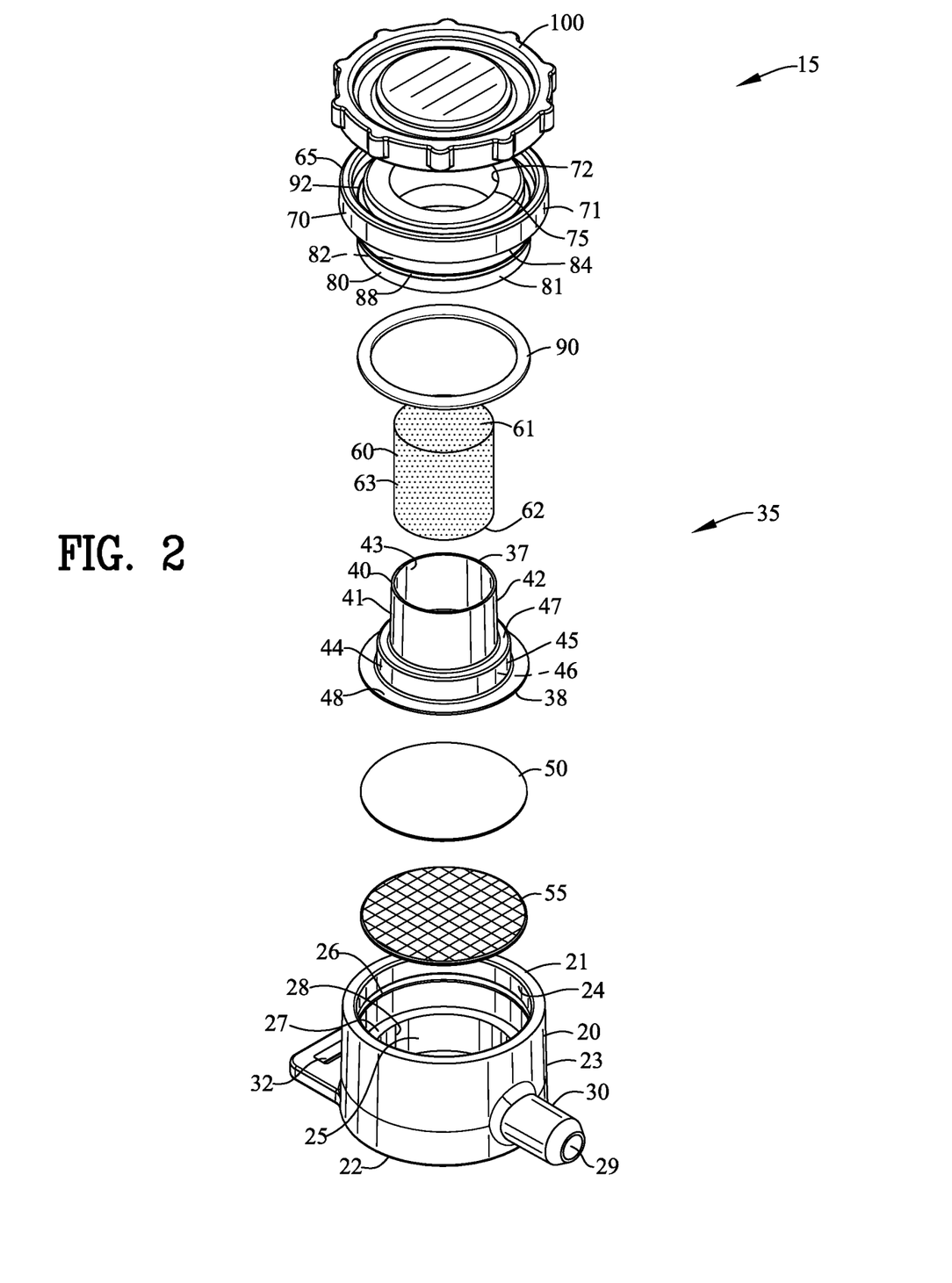
FIG. 2 is an exploded isometric view of a personal air sampler incorporating the present invention.
Figure 3:
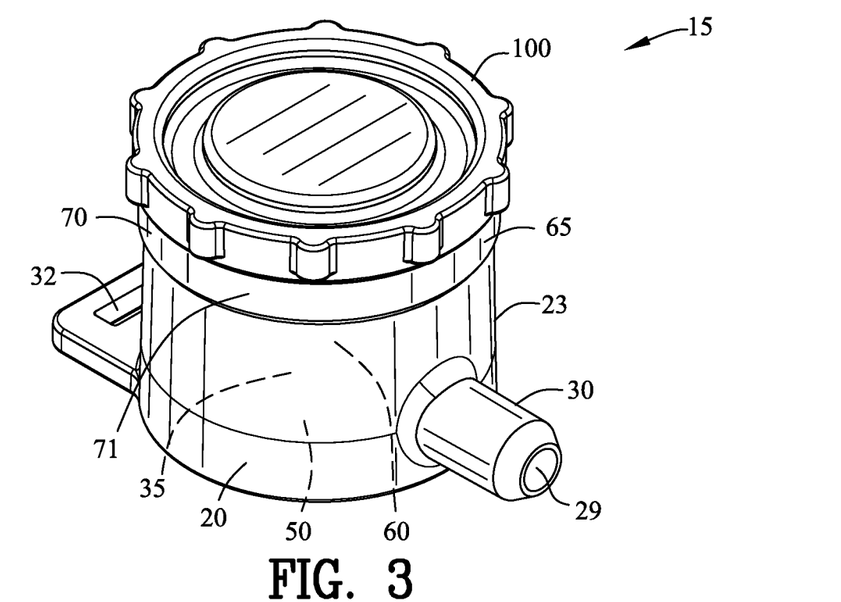
FIG. 3 is a top isometric view of the personal air sampler of FIG. 2.

FIG. 1 is an exploded view of a personal air sampler of the prior art as shown in U.S. Pat. No. 4,675,034. The personal air sampler has a body 1 of a part-threaded cylinder 2 mounted on a base plate 3. A gas exit pipe 4 connects with the inside of the cylinder. A synthetic rubber O-seal 5 sits on a shoulder in the top of the cylinder and sealably engages with the bottom shoulder of a filter cassette, 6. The cassette 6 comprises an annular bottom part 7 communicating with the inside of cylinder 2. The cassette 6 includes a filter paper disc 8, preferably on a fine metal grid support (not shown) with a fine PTFE washer 9 and a cassette top 10. The cassette top has an upper cylindrical portion 11 which acts as the lipped entry to the filter cassette.

A PTFE cylinder 12 sits upon the lower shoulder of the cassette top and transfers pressure from a threaded cap 13 which engages the thread on the cylinder 2. The cap has a central aperture 14. As cap 13 is screwed down onto the body of the sampler the cassette top is pressed into sealing engagement with the PFTE washer 9 and the cassette bottom part 7 is pressed into sealing engagement with the O-seal 5 and the body of the sampler.

In use, a filter cassette is pre-weighed under standard conditions, and, if necessary, stored in a sealed and numbered tin or the like. A sampler is assembled and fitted onto the lapel of a user, so that the lipped entry faces outwards, and a standard personal sampler pump (not shown) is attached to gas exit pipe 4. At the end of the shift, or other predetermined sampling time, the sampler may be disassembled, and the cassette reweighed.

In this embodiment of the sampler of the invention, all the dust collected within the filter cassette is to be considered as total inspirable dust and therefore is included in the total weight of dust. If desired, the dust deposited on the internal walls may be recovered by washing or brushing out and subjected to more detailed study.

Figure 9:
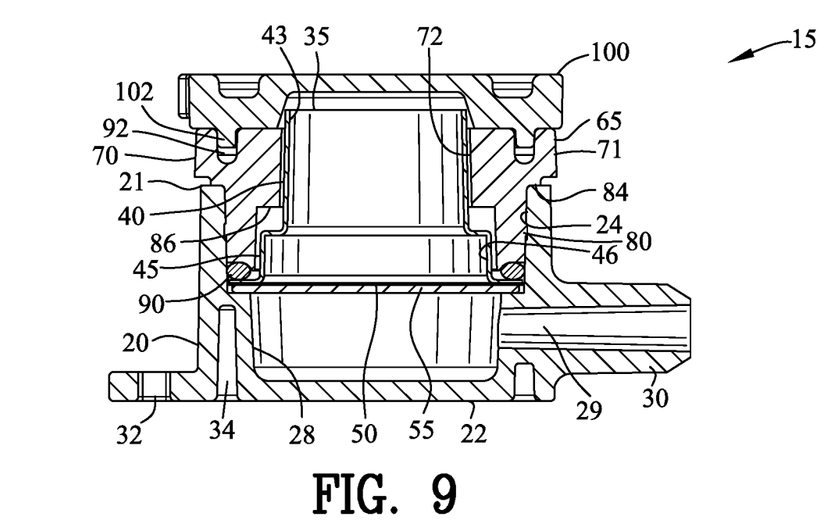
FIG. 9 is a side sectional view similar to FIG. 7 without the optional foam filter.
Figure 10:
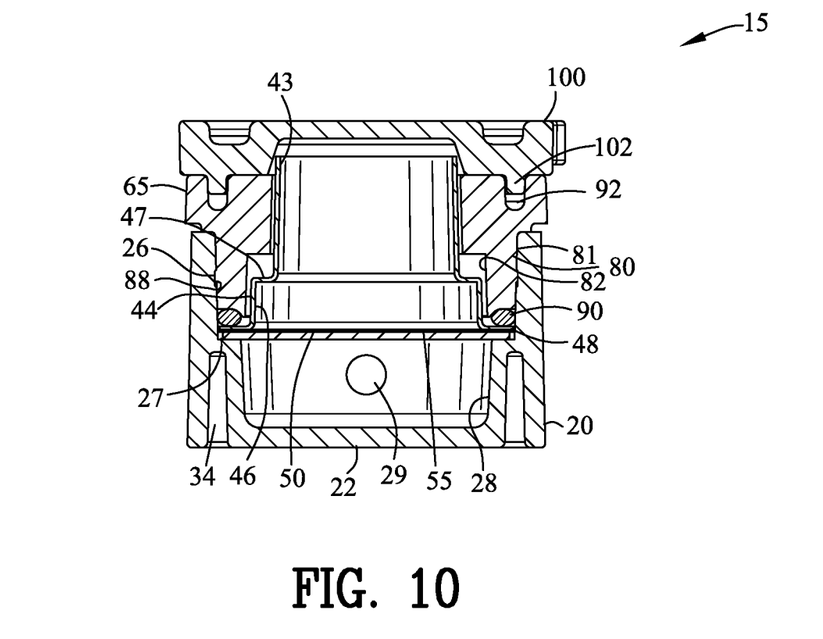
FIG. 10 is a side sectional view similar to FIG. 8 without the optional foam filter.
Figure 11:
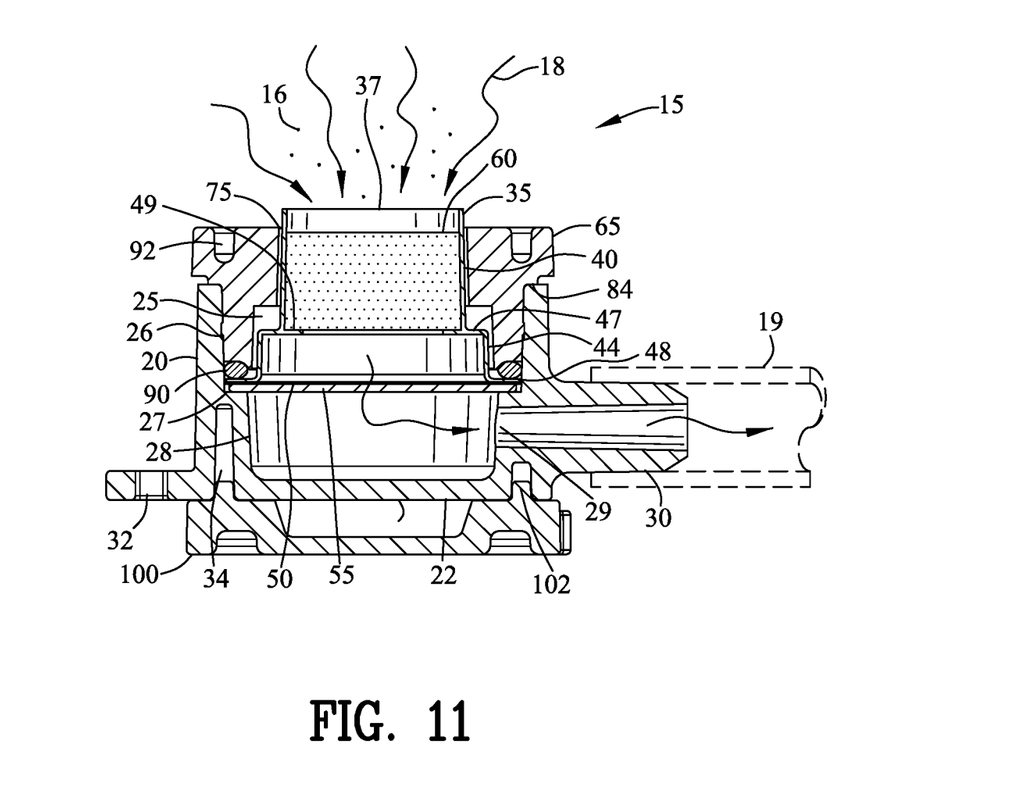
FIG. 11 is a side sectional view similar to FIG. 7 illustrating the operation of the personal air sampler of the present invention.
Figure 12:
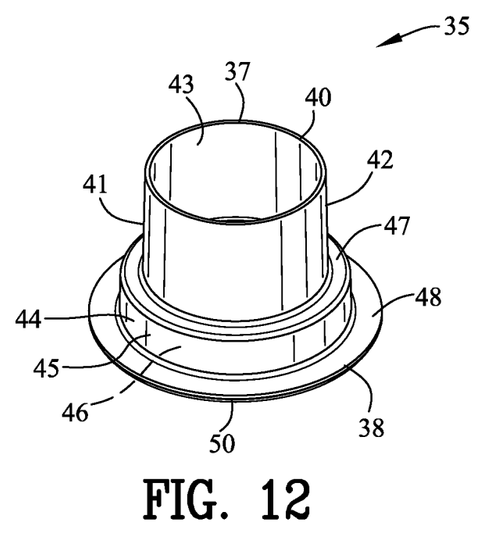
FIG. 12 is a top isometric view of a filter cassette of the personal air sampler of FIGS. 2-11.
Figure 13:
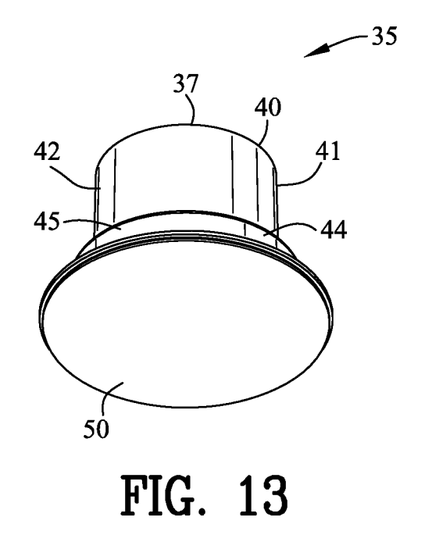
FIG. 13 is a bottom isometric view of the filter cassette of FIG. 12.
Figures 14, 15, 16:
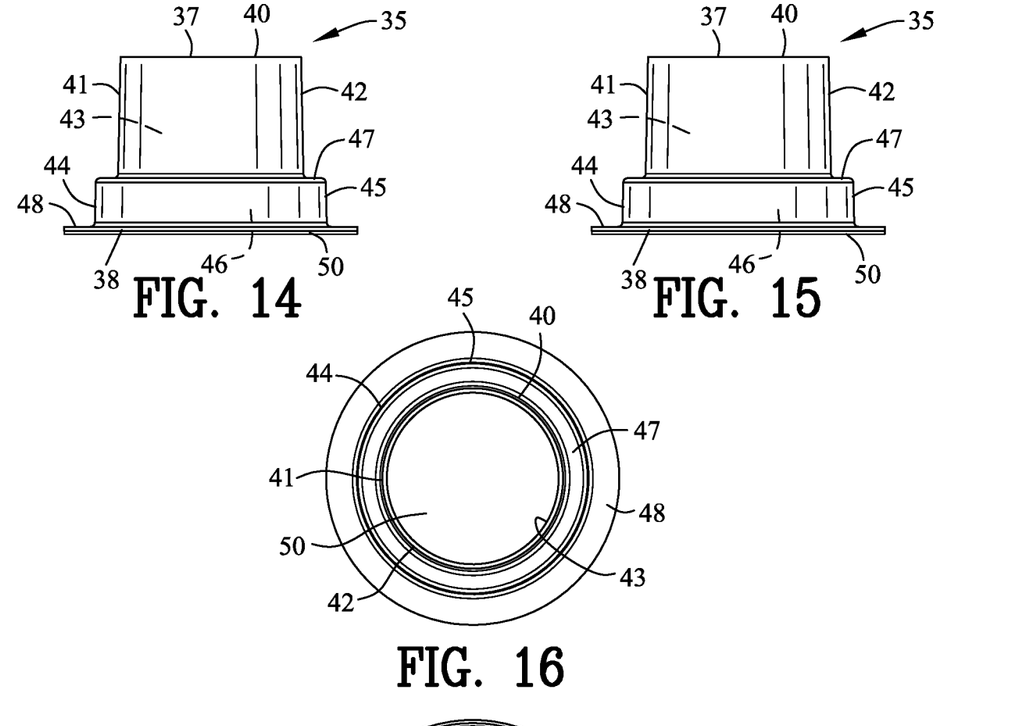
FIG. 14 is a front view of the of the filter cassette of FIG. 12.
FIG. 15 is a rear view of FIG. 12.
FIG. 16 is a top view of FIG. 12.
Figure 17:
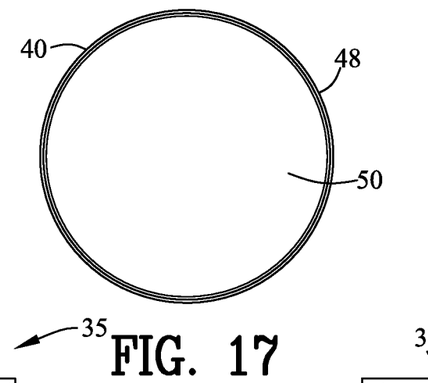
FIG. 17 is a bottom view of FIG. 12.
Figure 18:
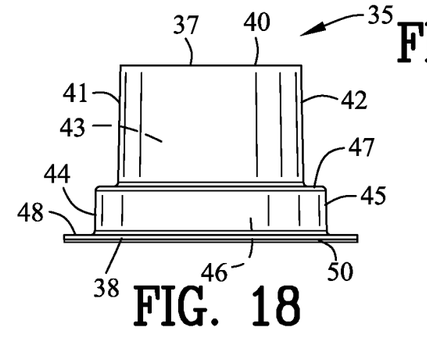
FIG. 18 is a left side view of FIG. 12.
Figure 19:
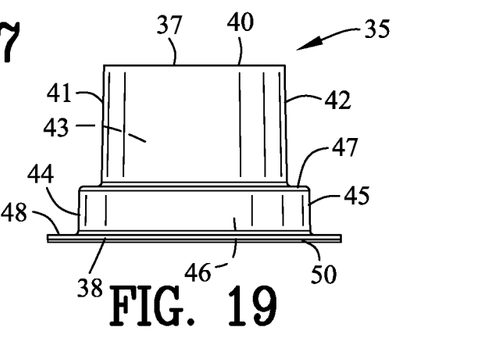
FIG. 19 is a right side view of FIG. 12.

FIGS. 2-10 are various views of an improved device 15 for collecting particulate matter 16 suspended in the ambient air 18 as shown in FIG. 11 through the use of a low pressure air source 19. The device 15 comprises a container 20 extending between an open first end 21 and a closed second end 22. In this example, the container 20 defines a cylindrical outer diameter 23 and a cylindrical inner diameter 24 defining a container interior 25. An annular recess 26 is defined in the cylindrical inner diameter 24 in proximity to the open first end 21 of the container 20.

A container interior ring 27 extends inwardly from the cylindrical inner diameter 24 in proximity to the closed second end 22 of the container 20. The container interior ring 27 defines an interior ring cylindrical diameter 28.

A container output 29 extends through the container interior ring 27 and communicates with the container interior 25. An output connector 30 extends from the cylindrical outer diameter 23 of the container 20 for connecting the container output 29 to the low pressure source 19 illustrated in FIG. 11.

Figure 4:
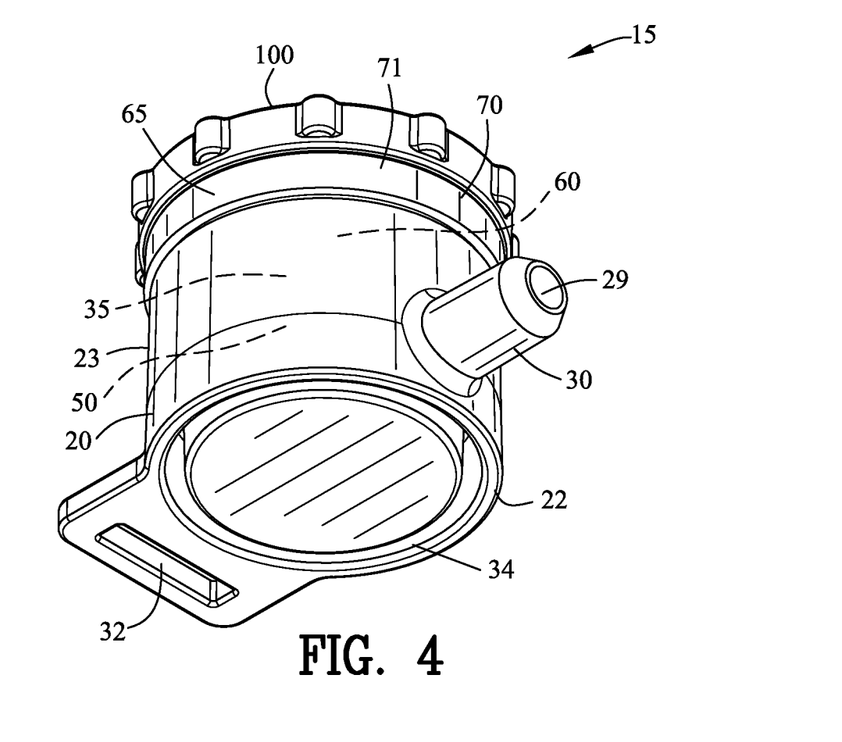
FIG. 4 is a bottom isometric view of the personal air sampler of FIG. 2.
Figure 5:
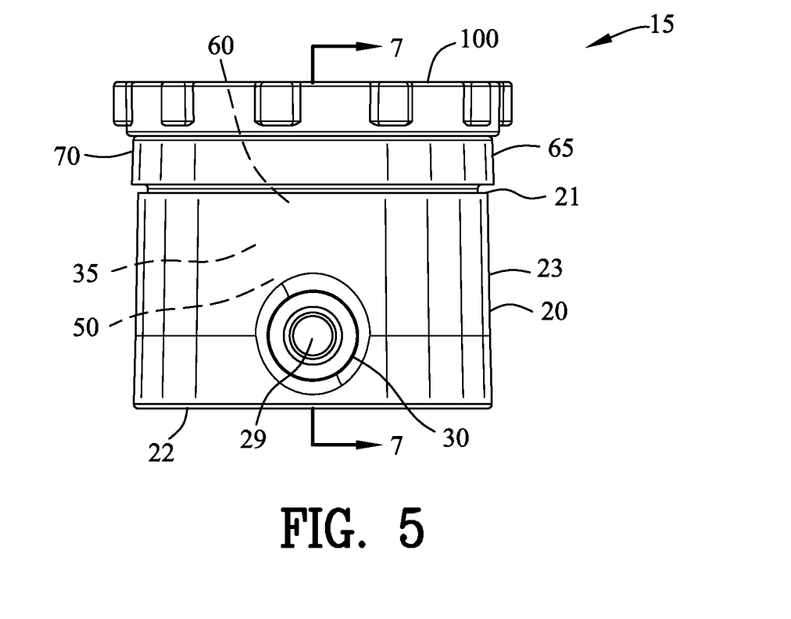
FIG. 5 is a front view of the personal air sampler of FIGS. 2-4.
Figure 6:
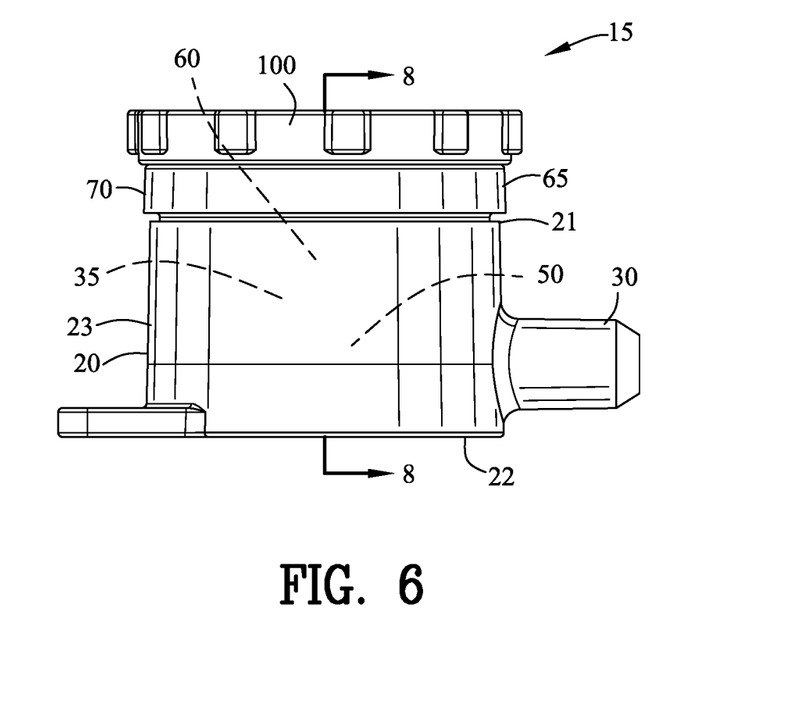
FIG. 6 is a side view of the personal air sampler of FIG. 24.

A loop 32 extends from the cylindrical outer diameter 23 of the container 20 for affixing the device 15 to an individual (not shown). It should be understood that the device 15 may be affixed to an individual (not shown) by various means and various orientations. AS best shown in FIG. 4, an operational closure groove 34 is defined into the second end 22 of the container 20.

A filter cassette 35 comprising a filter holder 40 with a collection filter 50 permanently affixed to the filter holder 40. A filter support 55 is positioned under the collection filter 50 for preventing distortion of the collection filter 50 during operation of the device 15. An optional foam filter 60 is retained within the filter holder 40 upstream from the collection filter 50. A complete explanation of the operation of the filter cassette 35 will be set forth hereinafter with reference to FIG. 11.

A retainer 65 comprises a first ring 70 and a second ring 80. The first ring defines a first ring outer cylindrical diameter 71 and a first ring inner cylindrical diameter 72. The first ring inner cylindrical diameter 72 defines a retainer input aperture 75.

The second ring 80 defines a second ring outer diameter 81 and the second ring inner diameter 82. As best show in FIGS. 7-10, an outer shoulder 84 is defined between the first ring outer cylindrical diameter 71 and the second ring outer cylindrical diameter 81. An inner shoulder 86 is defined between the first ring inner cylindrical diameter 72 and the second ring inner cylindrical diameter 82. An annular projection 88 extends outwardly from the second ring outer cylindrical diameter 81. The annular projection 88 is configured for engagement with the annular recess 26 of the container 20 for removably securing the retainer 65 to the container 20. It should be appreciated by those skilled in the art that the engagement between the annular projection 88 and the annular recess 26 may take various forms such as frictional engagements, threaded engagements, resilient engagements and the like.

A seal 90 is disposed between the second ring 80 of the retainer 65 and the flange 48 of the filter cassette 35. The seal 90 cooperates with the container interior ring 27 to seal the flange 48 of the filter cassette 35 to both the container 20 and the retainer 35.

A closure groove 92 is defined in an end of the first ring 70 of the retainer 65. As best show in FIGS. 7-10, a closure 100 includes a closure protrusion 102 configured to engage with the closure groove 93 for removably securing the closure 100 to the retainer 65.

It should be appreciated by those skilled in the art that the engagement between the closure protrusion 102 and the closure groove 93 may take various forms such as frictional engagements, threaded engagements, resilient engagements and the like.

Figure 7:
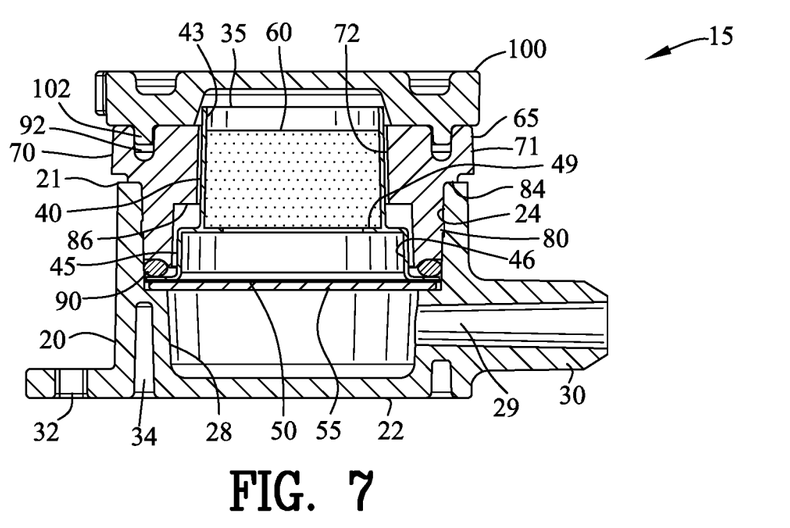
FIG. 7 is a side sectional view along line 7-7 in FIG. 5 including an optional foam filter.
Figure 8:
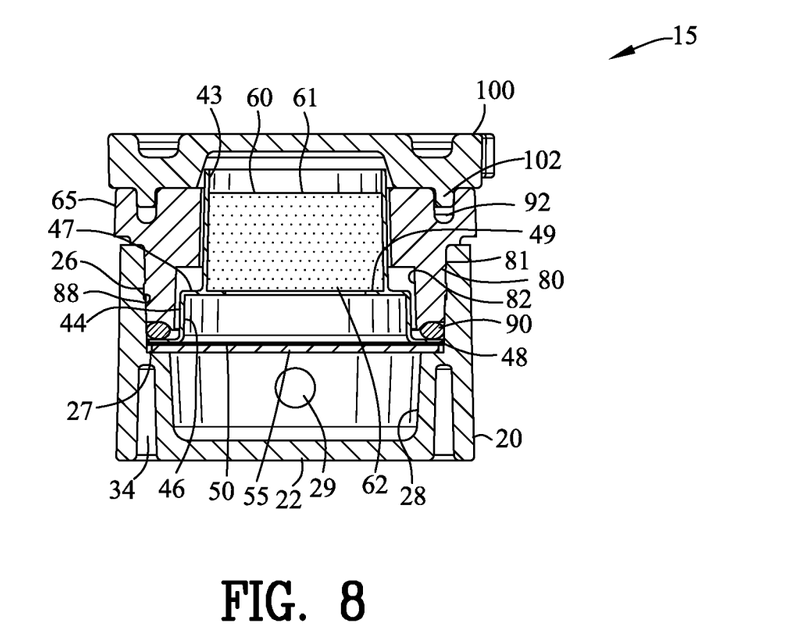
FIG. 8 is a sectional view along line 8-8 in FIG. 6 including the optional foam filter.

FIGS. 7 and 8 illustrate the device 15 in an assembled condition suitable for storage and shipping. The filter support 55 is positioned on the container interior ring 27 of the container 20. The filter holder 40 with the permanently affixed collection filter 50 is positioned on the filter support 55.

In this example, an optional ledge 49 extends inwardly from the shoulder 47 for providing a stop for the optional foam filter 60. The optional ledge 49 insures a consistent spacing between the optional foam filter 60 and the collection filter 50.

The second ring 80 of the retainer 65 is inserted into the container interior 25 of the container 20. As best show in FIG. 8, the annular projection 88 of the retainer 65 engages with the annular recess 26 of the container 20 for removably securing the retainer 65 to the container 20. The annular projection 88 of the retainer 65 and annual recess 26 of the container 24 are dimensionally located to squeeze the seal 90 to prevent ambient air 18 from flowing around the flange 48. The closure 100 is removably secured to the retainer 65 through the engagement of the closure protrusions 102 with the closure groove 92. An output cap show in FIG. 24, covers the output connector 34 to inhibit entry of contaminants therethrough.

FIGS. 9 and 10 illustrate the device 15 in an assembled condition suitable for storage and shipping. The filter support 55 is positioned on the container interior ring 27 of the container 20. The filter holder 40 with the permanently affixed collection filter 50 is positioned on the filter support 55. In this example, the filter cassette 35 lacks the optional ledge 49 and the optional foam filter 60. The second ring 80 of the retainer 65 is inserted into the container interior 25 of the container 20 as set forth with reference to FIGS. 7 and 8.

FIG. 11 illustrates the device 15 in an assembled condition suitable for operation of the present invention. The closure 100 has been removed from the first ring 70 of the retainer 65 and has been affixed to the second end 22 of the container 30. The closure protrusion 102 of the closure 100 engages with the operational closure grooves 34 to removably secure the closure 100 to the container 20. It should be appreciated by those skilled in the art that the engagement between the closure protrusion 102 and operational closure grooves 34 may take various forms such as frictional engagements, threaded engagements, resilient engagements and the like.

The output connector 30 is connected to the low pressure air source 19 as indicated by the arrow extending from the output connector 30. The closure 100 has been removed from the retainer 65 permitting ambient air to be drawn into the first ring inner diameter 72 by the low pressure air source 19. The ambient air first encounters the foam filter 60 to collect large particulate matter 16 present in the ambient air 18. Thereafter, the ambient air passes through the collector filter 50 whereat smaller particulate matter is captured by the collection filter 50.

After the process of collecting particulate matter 16 from the ambient air 18, the low pressure air source 19 is removed from the output connector 30 and the closure 100 is affixed to the retainer 65. The device 15 is transported to an appropriate location for an analysis of the particulate matter captured by the filter cassette 35.

To analyze the particulate matter 16 captured by the filter cassette 35, the closure 100 and the retainer 65 are removed from the container 20. The filter cassette 35 is removed for analysis by several means.

Firstly, filter cassette 35 may be analyzed by the difference in weight of the filter cassette 35 before collection of the particulate matter 16 and after collection of the particulate matter 16. The filter cassette 35 has a distinct advantage over the prior art by being low in weight. Secondly, the filter cassette 35 has the advantage of the fused collection filter 50 and eliminates the use of a mechanical connection of a collection filter found in the prior art. Thirdly, the filter cassette 35 is disposable. Fourthly, the filter cassette 35 presents a new opportunity for analyzing the particulate matter 16 by chemical means. The filter cassette 35 including the collection filter 50 and the foam filter 60 are formed from a soluble polymeric material. After the filter cassette 35 including the collection filter 50 and the foam filter 60 are dissolved by a solvent, the remaining precipitate may be quantitatively and/or quantitatively chemically analyzed.

FIGS. 12-19 illustrate the filter cassette 35 in greater detail. The filter cassette 35 extends between a first cassette end 37 and a second cassette and 38. The filter cassette 35 includes the filter holder 40 having a first cylindrical portion 41 and a second cylindrical portion 44. The first cylindrical portion 41 defines an outer diameter 42 and an inner diameter 43. The second cylindrical portion 44 defines an outer diameter 45 and an inner diameter 46. A shoulder 47 is located between the first cylindrical portion 41 and the second cylindrical portion 44. A flange 48 is affixed to the second cylindrical portion 44 in proximity to the second cassette end 38. The flange 48 may be extended to form the optional ledge 49. The filter holder 40 including the first cylindrical portion 41 and the second cylindrical portion 44, the flange 48 and the optional ledge 49 are formed as a one piece unit from a polymeric material.

Polymeric materials suitable for forming the filter holder 40 include polyvinyl chloride (PVC), cellulose or the like. Preferably, the collection filter 50 comprises a sheet filter paper having the proper porosity for collecting minute particulate matter 15 from the ambient air 16. The collection filter 50 is permanently affixed to the flange 48 by means such as fusion or any suitable and appropriate means.

In an alternative example, the filter 50 is separate and distinct from the filter holder 40. When the filter 50 is separate and distinct from the filter holder 40, the filter 50 is held in place between the filter holder 40 and the container 20 by a compression engagement. A separate and distinct filter 50 may be employed when (1) the filter 50 cannot be secured to the filter holder 40 or (2) a special filter material or a special filter coating is required in the filter 50.

In some instances, the filter 50 is made of a material that cannot be readily secured to the filter holder 40. Some examples are filters made of PTFE, glass fiber, nylon or material that require an undesirable adhesive. In addition, may users desire to utilize specialized filter material and/or filter coating that are not suitable for being secured to the filter holder 40.

Preferably, the filter holder 40 is formed from a material having limited moisture absorbing properties. The limited moisture absorbing properties of the filter holder 40 provides a stable weight to yield good reproducibility in weight measurements. The desired combined weight of the filter holder 40 and the filer 50 is below 600 milligrams.

In one example the filter holder 40 and the filter 50 are made of the same or similar material to be dissolved by a solvent after the filter 50 collects the particulate matter 16. In such an example, the particulate matter 16 is held in suspension by the solvent.

In another example, the filter holder 40 and the filter 50 are made of the same or similar material to impervious to a solvent after the filter 50 collects the particulate matter 16. In such an example, the particulate matter 16 is dissolved from the filter 50 by the solvent. Thereafter, the type and quantity of the particulate matter 16 can be analyzed.

The filter support 55 is formed from a gas porous material for allowing airflow therethrough for facilitating the collection of the particulate matter 16 by the filter 50. A material such as porous polyethylene is useful in such an application. In other instances, it is desirable to select a material for the filter support 55 that is porous for gas but inhibits the passing of a liquid therethrough under ambient gas pressure.

Referring back to FIGS. 2 and 7-9, the foam filter 60 extends from a first foam end 61 to a second form end 62. The foam filter 60 defines and outer diameter 63. The outer diameter 63 of the foam filter 60 is configured to resiliently engage the inner diameter 43 of the first cylindrical portion 41 of the filter holder 40. Although the foam filter 60 is desirable in collecting larger particulate matter 16, the use of the foam filter 60 may be considered optional in the practice of the present invention.

The present invention improves upon the personal air sampler set forth in U.S. Pat. No. 4,675,034 and provides a device having an improved design and improved filter cassette. The improved device has a disposable filter cassette and is capable of having a two stage filter cassette. The device may be formed from a solvent soluble filter cassette for extracting any collected particulate material from the filter.

Figure 20:
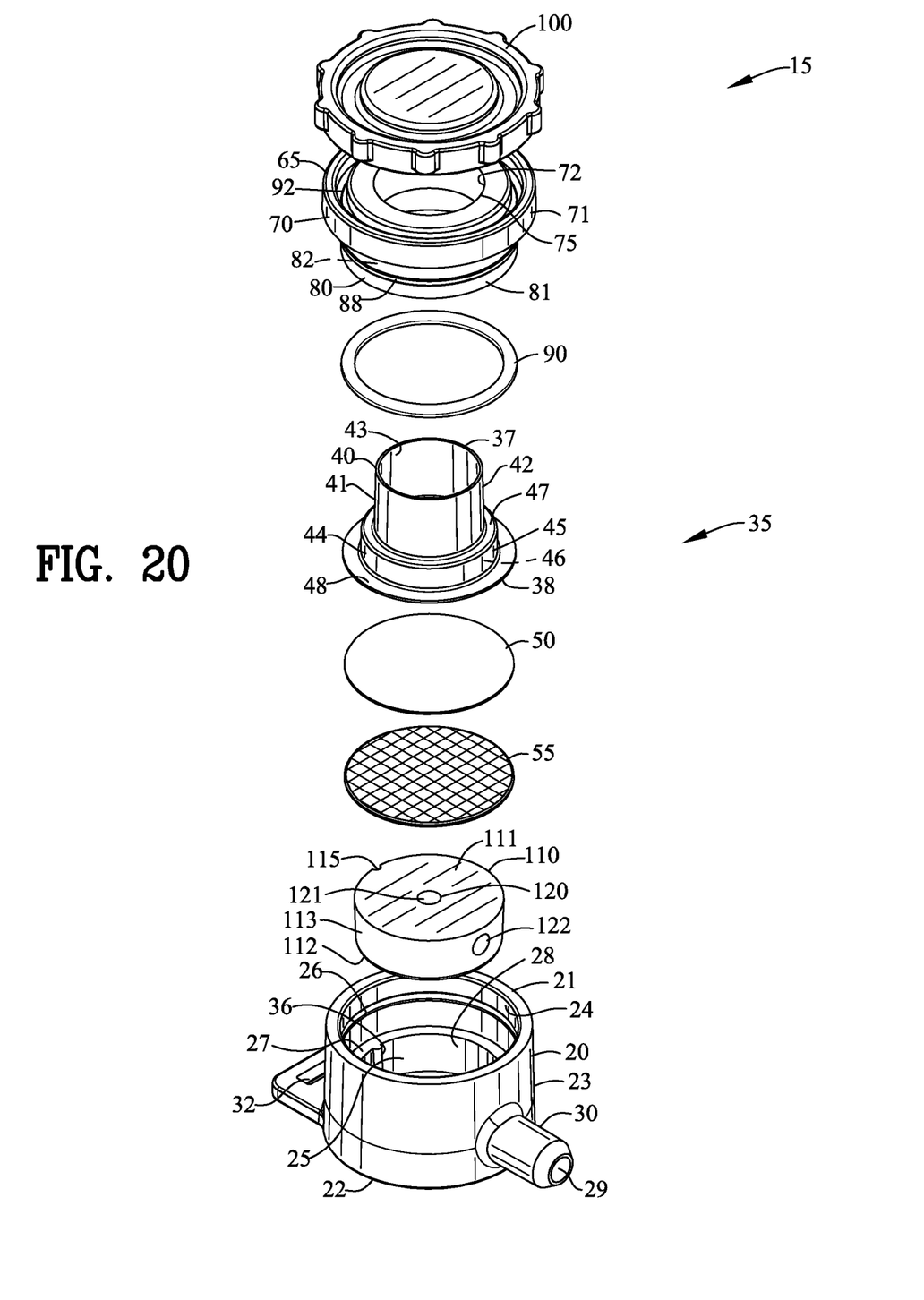
FIG. 20 is an exploded isometric view similar to FIG. 2 illustrating the personal air sampler of the present invention incorporating a volume reducing plug.
Figure 21:
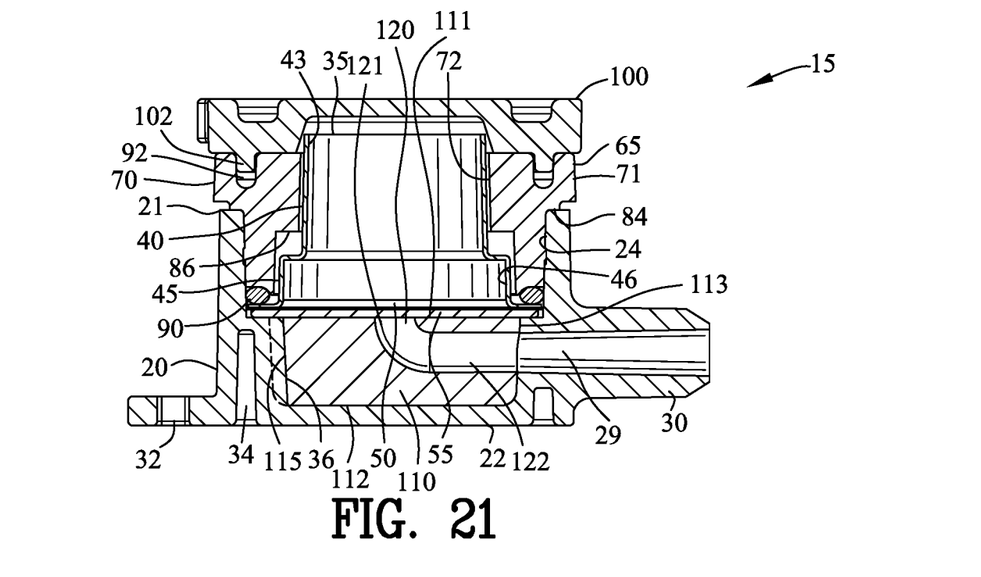
FIG. 21 is a sectional view similar to FIG. 9.
Figure 22:
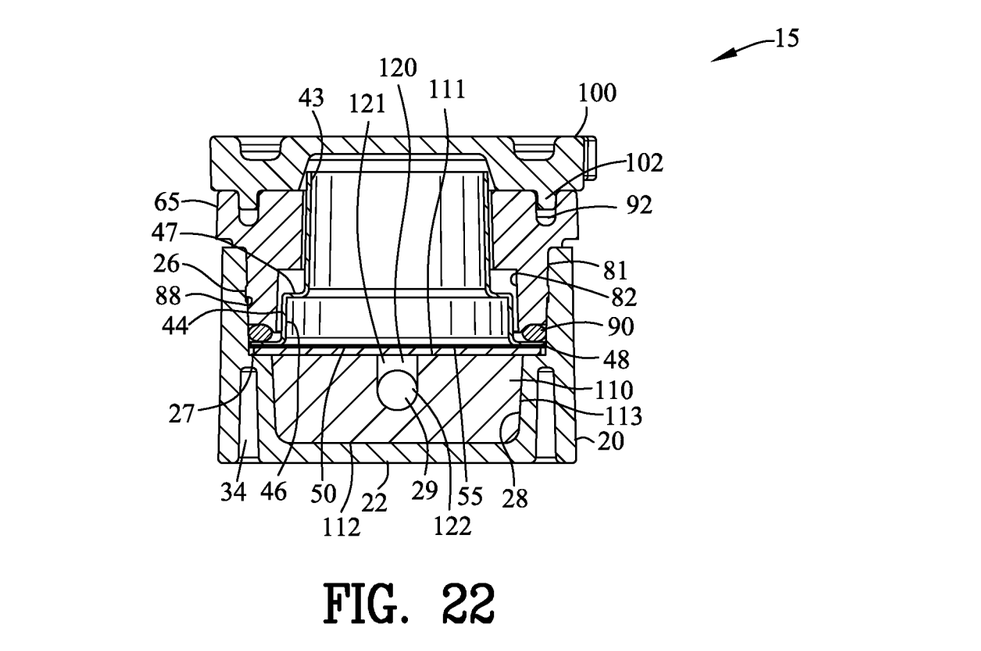
FIG. 22 is a sectional view similar to FIG. 10.

FIGS. 20-22 illustrating the personal air sampler 15 of the present invention incorporating a volume reducing plug 110. Similar reference characters in FIGS. 20-25 refer to similar parts shown in FIGS. 2-19. The volume reducing plug 110 comprises a top surface 111 and a bottom surface 112 interconnected by a cylindrical sidewall 113. An orienting groove 115 is defined in the cylindrical sidewall 113 for orienting the volume reducing plug 110 within the container interior 25 of the container 20. The volume reducing plug 110 may be solid or may be fabricated or molded to reduce the volume of the container interior 25 of the container 20.

A tunnel 120 is defined with the volume reducing plug 110 for communicating the container interior 25 of the container 20 and the container output 29. In this example, the tunnel 120 comprises an axial tunnel 121 coupled to a radial tunnel 122.

The interior ring cylindrical diameter 28 includes an orienting rib 36. The orienting rib 36 engages with the orienting groove 15 of the volume reducing plug 110 for aligning the radial tunnel 122 with the container output 29.

Figure 23:
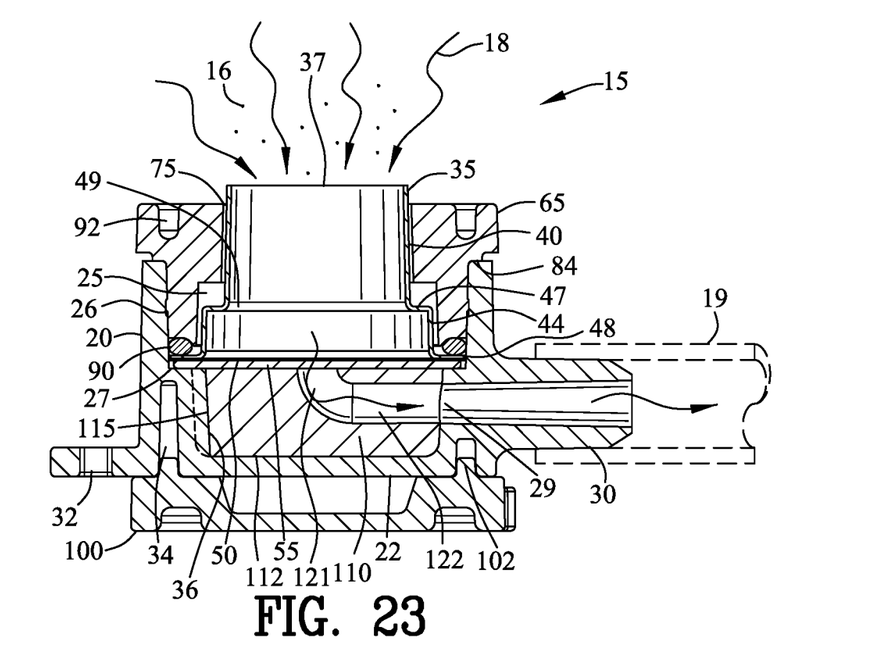
FIG. 23 illustrates the collection of particulate matter during the operation of the personal air sampler.

FIG. 23 illustrates the collection of particulate matter during the operation of the personal air sampler 15. The output connector 30 is connected to the low pressure air source 19 as indicated by the arrow extending from the output connector 30. The low pressure air source 19 of the container output 29 is communicated by the tunnel 120 to the container interior 25 of the container 20. The ambient air 18 is drawn into the first ring inner diameter 72 by the low pressure air source 19 with particulate material 16 suspended within the ambient air 18 being collected by the collection filter 50.

Figure 24:
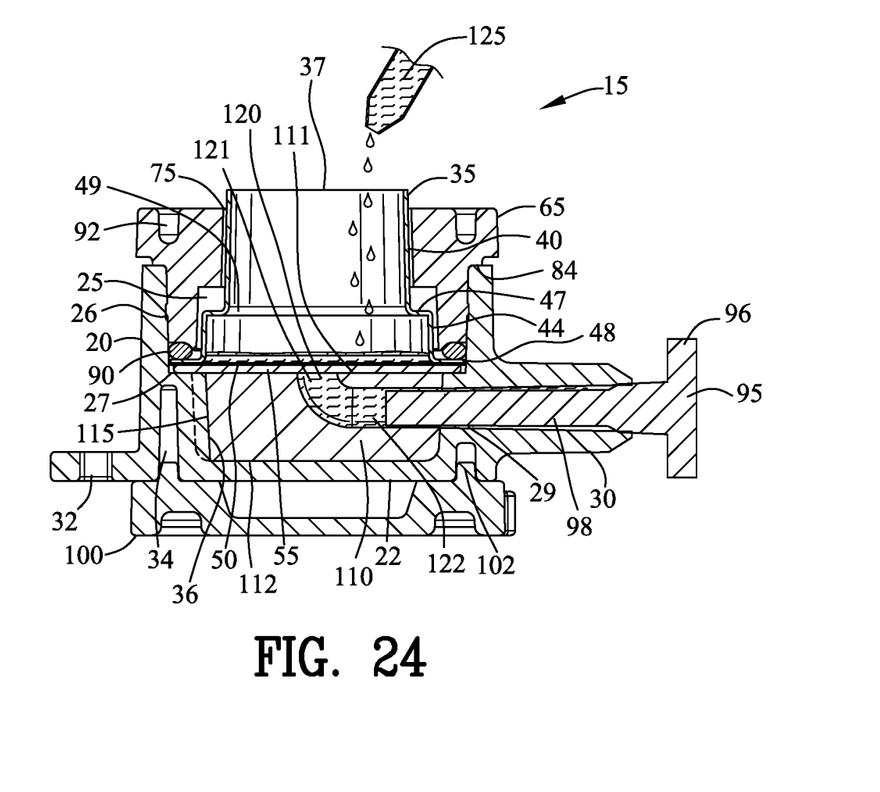
FIG. 24 illustrates the insertion of an output cap in the output port and the introduction of a liquid into the interior of the personal air sampler.

FIG. 24 illustrates the initial steps of analyzing the collected particulate material 16. An output cap 95 is installed on the output connector 30. In this example, the output cap 95 comprises a handle 96 and a stopper 98 for providing a fluid tight seal for the output 29.

A liquid 125 is introduced through the first ring inner diameter 72 to pass through the collection filter 50 and fill the tunnel 120. The liquid 125 by be selected to either (1) dissolve the particulate material 16 collected by the collection filter 50 or (2) physically wash or remove the particulate material 16 from the collection filter 50.

Figure 25:
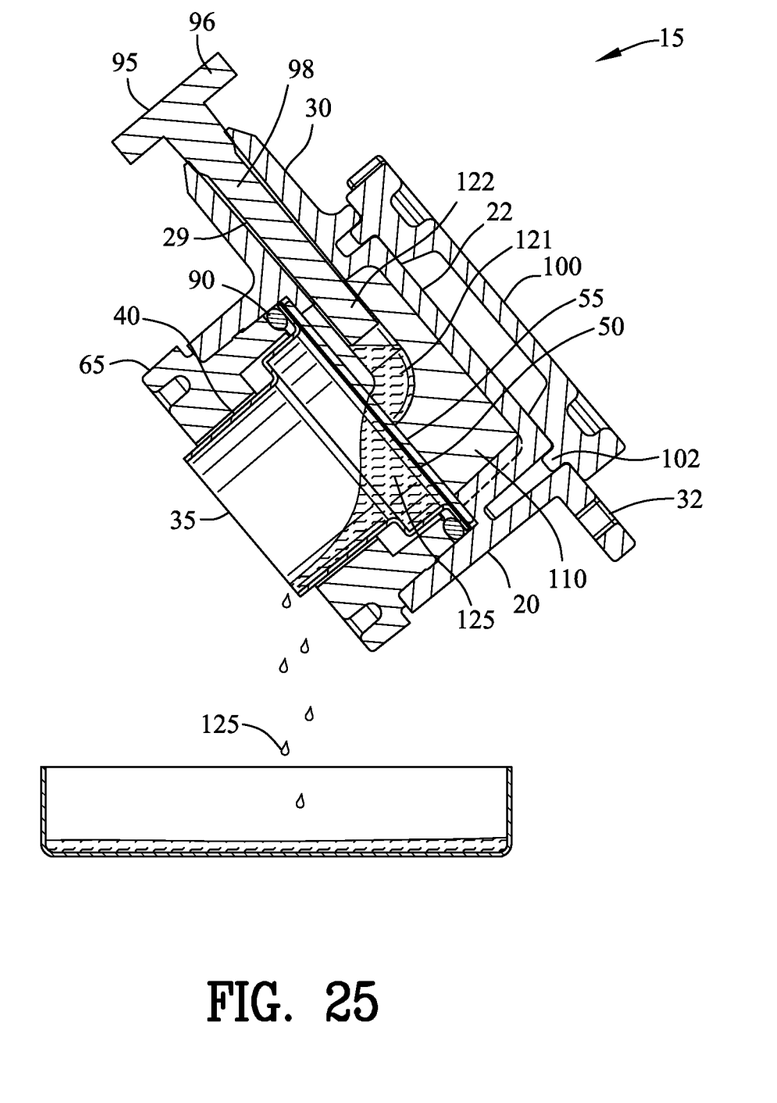
FIG. 25 illustrates the removal of the introduced a liquid along with particulate matter captured by the collection filter for local analysis.

FIG. 25 illustrates the removal of the introduced liquid 125 along with particulate matter 16 captured by the collection filter 50 for local analysis. The incorporation of the volume reducing plug 110 substantially reduces the amount of the liquid 125 required for removing the particulate material 16 from the collection filter 50. The reduction in the liquid 125 results in a more accurate analysis of the particulate material 16. Furthermore, the use of the volume reducing plug 110 permits the immediate analysis of the particulate material 16 at the site of the collection.

Figure 26:
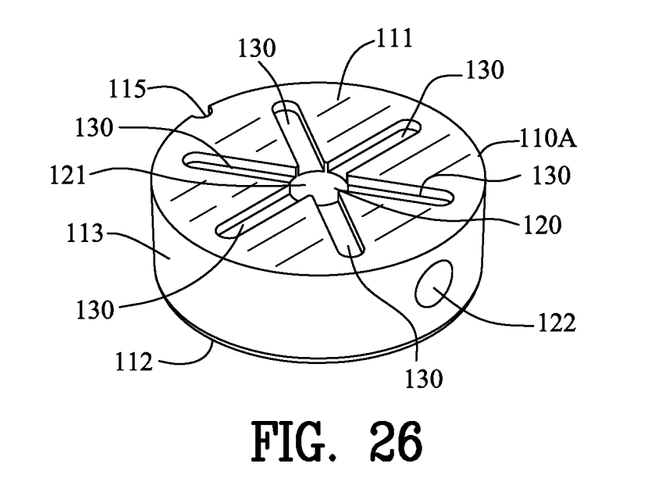
FIG. 26 is a variation of the volume reducing plug illustrated in FIGS. 20-25.
Figure 27:
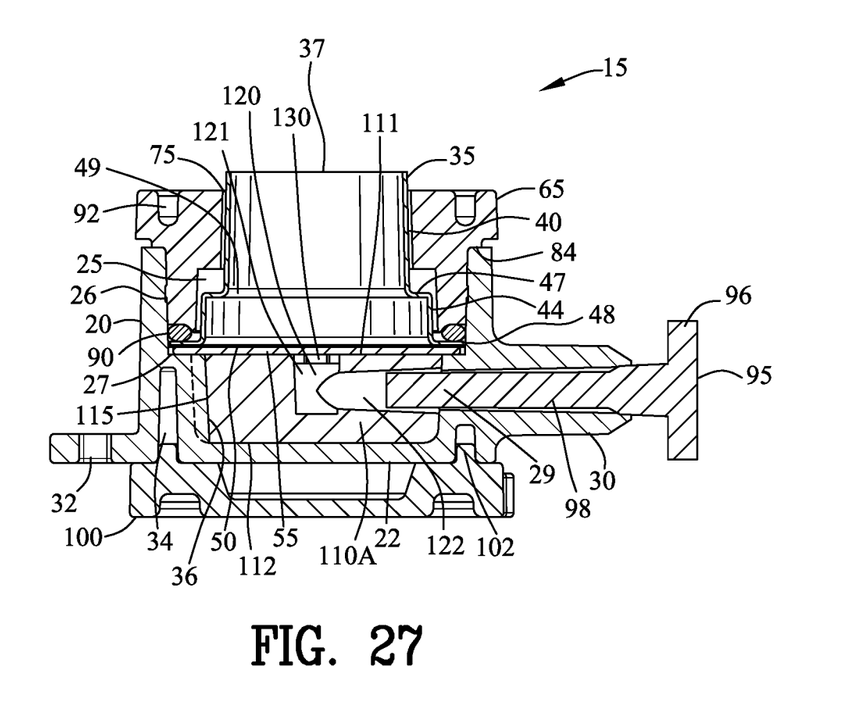
FIG. 27 is a side sectional view similar to FIG. 24 incorporating the volume reducing plug of FIG. 26.

FIGS. 26 and 27 illustrate a variation of the volume reducing plug 110A shown in FIGS. 20-25. Similar reference characters in FIGS. 26 and 27 refer to similar parts shown in FIGS. 20-25. In this embodiment, the volume reducing plug 110A includes a plurality of radial indentations 130 defines within the top surface 111 of the volume reducing plug 110A. Each of the plurality of radial indentations 130 communicates with the tunnel 120. More specifically, the interior end of each of the radial indentations 130 intersects with the axial tunnel 121 to communicate with the radial tunnel 122. The plurality of radial indentations 130 provides an enhanced and balanced airflow through the filter 50 and the support 55. In addition, the particulate matter 16 trapped by the filter 50 is more evenly distributed about the filter 50 by virtue of the inclusion of the plurality of radial indentations 130.

The present disclosure includes that contained in the appended claims as well as that of the foregoing description. Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and scope of the invention.

What is claimed is:

1. An improved device for collecting particulate matter suspended in the ambient air through the use of an air source, comprising:
   a container extending between an open first end and a closed second end defining a container interior;
   a container output communicating with said container interior located proximate said closed second end of said container;
   a filter cassette comprising a collection filter adjacent to a filter holder, wherein a combined weight of said collection filter and said filter holder is less than 600 milligrams;

a retainer having a retainer input removably secured to said open first end of said container for retaining said filter cassette between said retainer input and said container output;

a volume reducing plug located within said container interior for reducing the volume thereof, the volume reducing plug including an orienting groove for orienting the volume reducing plug within said container interior, a tunnel extending through said volume reducing plug for providing fluid communication between said container interior and said container output, the tunnel comprising an axial tunnel coupled to a radial tunnel; and an output connector for connecting said container output to the air source for drawing ambient air into said retainer input for enabling said collection filter to collect particulate matter suspended in the ambient air entering said retainer input.

2. The improved device of claim 1, further comprising a closure for closing said retainer input.

3. The improved device of claim 1, wherein said filter holder and said filter cassette are disposable.

4. The improved device of claim 1, wherein said collection filter is permanently affixed to said filter holder.

5. The improved device of claim 1, wherein said collection filter engages said filter holder by a compression engagement.

6. The improved device of claim 1, wherein said collection filter is permanently heat sealed to said filter holder.

7. The improved device of claim 1, wherein said filter holder and said collection filter are formed from a polymeric material.

8. The improved device of claim 1,
wherein said filter holder and said collection filter are formed from a soluble material; and
said filter holder and said collection filter being dissolved by a solvent for extracting any collected particulate material from said collection filter.

9. The improved device of claim 1,
wherein said filter holder and said collection filter are formed from a solvent resistant material; and
said solvent dissolving and extracting any collected particulate matter from said collection filter.

10. The improved device of claim 1, wherein said filter cassette includes a foam filter located upstream from said collection filter for collecting particulate matter suspended in the ambient air.

* * * * *